United States Patent
Sommer et al.

(10) Patent No.: US 7,257,176 B2
(45) Date of Patent: Aug. 14, 2007

(54) METHOD OF FREQUENCY AND PHASE OFFSET ESTIMATION USING LEAST SQUARE METHOD IN A BURST RECEIVER

(75) Inventors: Naftali Sommer, Rishon-Le-Zion (IL); Itay Lusky, Hod Hasharon (IL); Lior Ophir, Herzlia (IL)

(73) Assignee: Texas Instruments Incorporated, Dallas, TX (US)

( * ) Notice: Subject to any disclaimer, the term of this patent is extended or adjusted under 35 U.S.C. 154(b) by 755 days.

(21) Appl. No.: 10/438,400

(22) Filed: May 15, 2003

(65) Prior Publication Data

US 2004/0228390 A1 Nov. 18, 2004

(51) Int. Cl.
*H04L 27/06* (2006.01)

(52) U.S. Cl. .................................. 375/344; 375/140

(58) Field of Classification Search ............... 375/344, 375/140, 144, 148, 346
See application file for complete search history.

(56) References Cited

U.S. PATENT DOCUMENTS 6,566,922 B1 * 5/2003 Schell et al. ............... 327/156

* cited by examiner

*Primary Examiner*—Kevin Kim
(74) *Attorney, Agent, or Firm*—Steven A. Shaw; W. James Brady; Frederick J. Telecky, Jr.

(57) ABSTRACT

A method provides frequency and phase offset estimation in a SCDMA burst receiver (such as a DOCSIS 2.0 SCDMA burst receiver) by application of the known Least Square (LS) parameter estimation algorithm to a pre-known transmitted sequence, called preamble, in order to optimally characterize the phase and frequency offsets affecting the transmitted data. The LS parameter estimation algorithm is adapted to SCDMA burst receiver specifications by changing index calculations to fit according to SCDMA preamble locations. Improved estimation accuracy can be achieved by using weighted least squares that disregard symbols affected by impulse and burst noise. Weighted least squares can further impart more weight to last symbols to more accurately estimate contemporary impairments. The method is particularly useful for communication systems having large frequency and phase offsets as in the DOCSIS 2.0 SCDMA burst receiver.

13 Claims, 1 Drawing Sheet

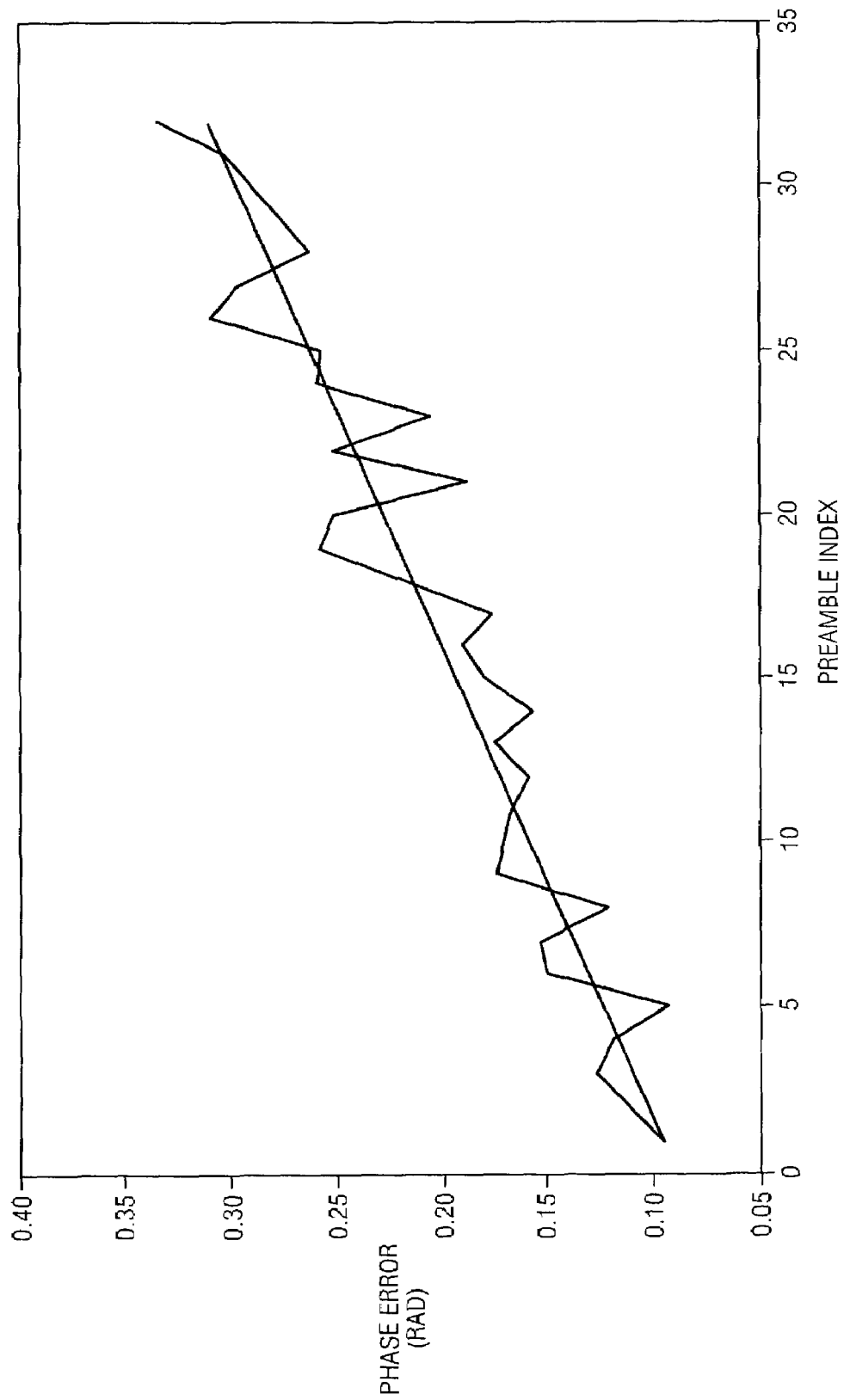

METHOD OF FREQUENCY AND PHASE OFFSET ESTIMATION USING LEAST SQUARE METHOD IN A BURST RECEIVER

BACKGROUND OF THE INVENTION

1. Field of the Invention

This invention relates generally to digital communication systems and methods, and more particularly to a technique of estimating frequency and phase offset using the Least Square Method (LSM) in a synchronized code division multiple access (e.g SCDMA) burst receiver that was implemented, for example, in DOCSIS 2.0 standard.

2. Description of the Prior Art

Frequency and phase offsets are important parameters to estimate in a burst receiver. Those parameters are estimated during channel maintenance and verified during processing of each burst preamble. In at least one modem burst receiver, the frequency and phase offsets are estimated using a correlator output. In SCDMA applications, this technique may not be accurate enough for the following reasons:

1. Due to the structure of the framer, it is possible to find a difference of 128*16=2k chips between the center of the preamble (where the correlator estimates the phase) and the beginning of the data. In the case of, for example, 50 Hz frequency offset @ 1.28 Mbaud, this results in a phase shift of 2k*50/1.28e6*360~30 degrees, which is obviously unacceptable. A technique for achieving an accurate estimation of the phase of the first spreading interval should therefore be employed.
2. In the worst-case scenario, only one mini-slot will be granted to a certain burst, resulting in only two active codes. As a result, only two training symbols may be processed before the phase would change in response to a frequency offset. In the case of a 50 Hz frequency shift @ 1.28Mbaud, for example, the phase change would be 128*50/1.28e6*360~1.8 degrees. A method for achieving an accurate estimation of the frequency offset should therefore be utilized.

In view of the foregoing, a need exists in burst receiver applications, such as the SDCMA burst receiver implemented, for example, in DOCSIS2.0 standard, for a scheme to provide accurate estimations of the phase of the first spreading interval as well as accurate estimations of any frequency offset. The scheme would desirably provide a good tool to combat impulse and burst noise affecting the preamble.

SUMMARY OF THE INVENTION

The present invention is directed to a method of providing frequency and phase offset estimation in a burst receiver such as a SCDMA burst receiver, among others, by application of the known Least Square (LS) parameter estimation algorithm to a pre-known transmitted sequence, called preamble, in order to optimally characterize the phase and frequency offsets affecting the transmitted data. The LS parameter estimation algorithm is adapted to SCDMA burst receiver specifications by changing index calculations to fit SCDMA preamble locations. Improved estimation accuracy can be achieved by using weighted least squares that disregard symbols affected by impulse and burst noise. Weighted least squares can further impart more weight to last symbols to more accurately estimate contemporary impairments. The method is particularly useful for communication systems having large frequency and phase offsets as in the SCDMA burst receiver.

According to one embodiment, a method of estimating frequency and phase offset in a burst receiver comprises the steps of 1) receiving a predetermined sequence of incoming symbols defining a burst preamble; 2) calculating the phase in the complex plane of each symbol and generating a phase matrix there from; and 3) implementing least square parameter estimation on the predetermined sequence of incoming symbols based on the burst preamble symbol phase matrix to estimate incoming data phase offset and frequency offset.

BRIEF DESCRIPTION OF THE DRAWINGS

Other aspects and features of the present invention and many of the attendant advantages of the present invention will be readily appreciated as the invention becomes better understood by reference to the following detailed description when considered in connection with the accompanying drawing figure thereof and wherein:

The single FIGURE is a simulated output plot illustrating phase error in a SCDMA burst receiver in response to a changing preamble index when using a least squares algorithm to estimate frequency and phase offset according to one embodiment of the present invention.

While the above-identified drawing figure sets forth a particular embodiment, other embodiments of the present invention are also contemplated, as noted in the discussion. In all cases, this disclosure presents illustrated embodiments of the present invention by way of representation and not limitation. Numerous other modifications and embodiments can be devised by those skilled in the art which fall within the scope and spirit of the principles of this invention.

DETAILED DESCRIPTION OF THE PREFERRED EMBODIMENTS

The preferred embodiments are directed to a method of providing frequency and phase offset estimation in a SCDMA burst receiver by application of the known Least Square (LS) parameter estimation algorithm to a pre-known transmitted sequence, called preamble, in order to optimally characterize the phase and frequency offsets affecting the transmitted data. The LS parameter estimation algorithm is adapted to SCDMA burst receiver specifications by changing index calculations to fit SCDMA preamble locations. Improved estimation accuracy can be achieved by using weighted least squares that disregard symbols affected by impulse and burst noise. Weighted least squares can further impart more weight to last symbols to more accurately estimate contemporary impairments. The method is particularly useful for communication systems having large frequency and phase offsets as in the SCDMA burst receiver. In order to better understand the method described herein below, the method will be described first using the LS estimation calculation algorithm in continuous time, and second, using the LS estimation calculation algorithm in non-continuous time.

Least Square Estimation Calculation: Continuous Time

It is first assumed the input for the LS method is the preamble symbol phase error that is calculated by subtracting the symbol phase in the IQ plane from the transmitted symbol phase. Those skilled in the art will readily appreciate there are numerous well known techniques that can be employed to implement this task; and so a further discussion of such techniques will not be discussed herein to enhance clarity and preserve brevity.

Second, it is assumed the symbols are received continuously during time interval [−N, N]. This assumption may not be true in SCDMA due to the framer structure and the step-size used by the interleaver to determine preamble location. This assumption is still valid however, where Pramble_Length=K*Number_Of_Spreading_Intervals, where K is an integer.

Third, it is assumed that any possible gain mismatch is ignored for the LS method using continuous time.

Assume now there are 2N+1 input samples that can be described as shown below in which V is additive white Gaussian noise (AWGN) with variance v. The input samples can be described in this way since phase offset is a constant offset while frequency offset is a constant phase offset accumulated each time unit. Therefore the total measured phase of a specific symbol consists of phase offset+ time_index*frequency_offset. The below equations exemplify this idea where Pi is the actual measured phase for symbol in time i, [−N N] are the time locations and Vi is the AWGN added to the symbol in time i. Each phase Pi can be measured, for example, by measuring the phase between the real and imaginary axis of each QAM received symbol.

$$P_1 = \text{Phase\_Offset} - (N) * \text{Frequency\_Offset} + V_1$$

$$P_2 = \text{Phase\_Offset} - (N-1) * \text{Frequency\_Offset} + V_2$$

$$\vdots \quad \vdots \quad \vdots$$

$$P_{2N+1} = \text{Phase\_Offset} - (N-1) * \text{Frequency\_Offset} + V_{2N+1}$$

$$\Downarrow$$

$$\underline{P} = \begin{bmatrix} 1 & -N \\ 1 & -(N-1) \\ \vdots & \vdots \\ 1 & N \end{bmatrix} \begin{bmatrix} \text{Phase\_Offset} \\ \text{Frequency\_Offset} \end{bmatrix} = \underline{H\theta}$$

where $V_i$ is additive white Gaussian noise (AWGN).

The known LS method can now be employed using the input symbols (P) in order to estimate the required parameters in which ($\underline{\theta}$=phase_offset and frequency_offset).

The weighted least square solution is: $\hat{\theta}wls = (H^T W H)^{-1} H^T W P$, where for the AWGN case, the $$W = \begin{bmatrix} 1/\sigma_v^2 & & \\ & 1/\sigma_v^2 & \\ & & \ddots \end{bmatrix},$$

$\sigma_v^2$ is the AWGN variance, and the weighted least square is identical for the least square solution. Solving the above linear equations then yields $$\text{Phase\^\_Offset} = \frac{1}{2N+1} \sum_{i=-N}^{N} P_i$$

$$\text{Frequen\^c y\_Offset} = \frac{3}{N(N+1)(2N+1)} \sum_{i=-N}^{N} i \cdot P_i$$

And the achieved MSE is:

$$E\left[(\text{Phase\_Offset}\hat{-}\text{Phase\_Offset})^2\right] = \frac{\sigma_v^2}{2N+1}$$

$$E\left[(\text{Frequency\_Offset}\hat{-}\text{Frequency\_Offset})^2\right] = \frac{3\sigma_v^2}{N(N+1)(2N+1)}$$

As can be seen, the least square method can easily be implemented in hardware, assuming the input phase error can also be easily calculated.

The weighted least square method can provide effective tools to deal with impulse and burst noise. Impaired symbols can be detected, for example, by examining symbol error. Those symbols can be discarded when computing the least square. This technique requires least square estimation for the non-continuous time case described herein below.

Least Square Estimation Calculation: Non-Continuous Time

The least square estimation in this case is calculated for the case when input data is not continuous in time, as is usually the case for synchronous code division multiple access (SCDMA) frames. SCDMA transmission in the DOCSIS2.0 standard is based on frames. Each frame is built of few columns (called spreading interval) and few rows (called number of active codes). The preamble symbols, for which the LS method described herein are based upon, are interleaved in different spreading intervals according to a specific interleaver function and therefore can not be considered as continuous in time as was analyzed herein before. Therefore the equations defined herein above need to be changed the following way:

$$P = \text{Phase\_Offset} + \text{Frequency\_Offset} * x_i = \underline{H\theta}$$

where Xi is the spreading interval location of symbol i. Rewriting the above equations and solving the linear equations yields the following:

$$(H^T H)^{-1} = \begin{pmatrix} n & \sum_{i=1}^{n} x_i \\ \sum_{i=1}^{n} x_i & \sum_{i=1}^{n} x_i^2 \end{pmatrix}^{-1} \qquad (1)$$

$$= \frac{1}{n \sum_{i=1}^{n} x_i^2 - \left(\sum_{i=1}^{n} x_i\right)^2} \begin{pmatrix} \sum_{i=1}^{n} x_i^2 & -\sum_{i=1}^{n} x_i \\ -\sum_{i=1}^{n} x_i & n \end{pmatrix}$$

$$H^T P = \begin{pmatrix} \sum_{i=1}^{n} p_i \\ \sum_{i=1}^{n} p_i x_i \end{pmatrix}$$

$$\Downarrow$$

$$\hat{\theta}wls = (H^T W H)^{-1} H^T W P \Rightarrow$$

$$\begin{bmatrix} \text{Phase\^\_Offset} \\ \text{Frequen\^c y\_Offset} \end{bmatrix} = \frac{1}{n \sum_{i=1}^{n} x_i^2 - \left(\sum_{i=1}^{n} x_i\right)^2}$$

$$\begin{pmatrix} \sum_{i=1}^{n} x_i^2 \cdot \sum_{i=1}^{n} p_i - \sum_{i=1}^{n} x_i \cdot \sum_{i=1}^{n} p_i x_i \\ n \cdot \sum_{i=1}^{n} p_i x_i - \sum_{i=1}^{n} x_i \cdot \sum_{i=1}^{n} p_i \end{pmatrix}$$

where the ^symbol means estimated parameter. Equation (1) can then be simplified by defining constants as follows:

$$\overline{\sigma}_{xp} = \frac{1}{n}\sum_{i=1}^{n} x_i p_i \quad \overline{m}_x = \frac{1}{n}\sum_{i=1}^{n} x_i \quad \sigma_{xp} = \overline{\sigma}_{xp} - \overline{m}_x \overline{m}_p \quad (2)$$

$$\overline{\sigma}_{xx} = \frac{1}{n}\sum_{i=1}^{n} x_i^2 \quad \overline{m}_p = \frac{1}{n}\sum_{i=1}^{n} p_i \quad \sigma_{xx} = \overline{\sigma}_{xx} - \overline{m}_x^2$$

$$\begin{bmatrix} \text{Phase\_Offset} \\ \text{Frequen\hat{c}y\_Offset} \end{bmatrix} = \begin{pmatrix} \overline{m}_p - \frac{\sigma_{xp}}{\sigma_{xx}} \cdot \overline{m}_x \\ \frac{\sigma_{xp}}{\sigma_{xx}} \end{pmatrix}$$

It can be appreciated that for fixed and pre-known n, the denominator in equation (1) can be pre-calculated by a host data processor such as a CPU, DSP, micro-controller, microcomputer, and the like, avoiding the need to implement a divider in hardware.

The least square method of estimating frequency and phase offset in a DOCSIS2.0 SCDMA burst receiver was simulated using simulation input parameters including WGN SNR, phase offset, frequency offset, preamble length, number of spreading intervals and number of preambles to average (parameter Sim_len=10,000). For each preamble, WGN, phase and frequency offsets were added in stage 1. A phase error was generated in stage 2; and phase and frequency offsets were estimated in stage 3 using the method described herein above. Stage 4 repeated stages 1-3 Sim_Len times. Whenever the preamble length=k*number of spreading intervals, stages 1-4 were repeated Sim_Len*k times, and every k sequential results were averaged to implement stage 5. In stage 6, the simulation output was then calculated.

The figure is a graph illustrating one example of the simulation test output that shows phase error (radians) versus preamble index for an estimated frequency offset of 11 Hz and an estimated phase offset of 0.0948 radians.

The Table below depicts the standard deviation (STD) of the estimated parameters, in which the mean of the estimated parameters were identical to the actual used offsets. Using different frequency offsets (10, 50, 100 Hz) and different Baud rates was found by the present inventors to generate the same output STD (in Rad/Symbol) as can be expected from achieved MSE formulas described herein before with reference to continuous time, where the frequency offset is not part of the MSE. For convenience and to preserve brevity, only one set of outputs is represented.

The frequency offset estimation STDs were found by the present inventors to be exactly as expected by theory (such as achieved via MSE equations derived in association with the continuous time case discussed herein before). The phase offset STD was found to be higher since the phase of the first symbol (=phase offset estimation) was calculated using the estimated frequency offset and not the actual one (as would happen in reality). This can be explained since phase_offset at first spreading interval=estimated phase offset by LS method−(number of spreading intervals/2)*estimated frequency offset. Since the frequency offset estimation has variance as well, the final phase offset estimation will be with higher variance compared to the theoretical one). When the exact frequency offset was used instead of an estimated one, the phase offset STD achieved was found by the present inventors to be exactly as expected by theory as well.

TABLE

Simulation Results

| SNR [dB] | Preamble Length | Number of Spreading Intervals | Phase STD [Rad] | Freq STD [Rad/Symbol] | Freq STD [Hz @ 5.12 Mbaud] | Freq STD [Hz @ 1.28 Mbaud] |
|---|---|---|---|---|---|---|
| 15 | 32 | 32 | 0.0436 | 0.0024 | 15.3 | 3.83 |
| 15 | 32 | 16 | 0.0427 | 0.0049 | 31 | 7.75 |
| 15 | 32 | 8 | 0.0408 | 0.0098 | 62.3 | 15.58 |
| 15 | 32 | 4 | 0.0372 | 0.0199 | 127 | 31,75 |
| 15 | 16 | 32 | 0.0603 | 0.0034 | 21.90 | 5.48 |
| 15 | 16 | 16 | 0.0611 | 0.0069 | 43.9 | 10.98 |
| 15 | 16 | 8 | 0.0579 | 0.0139 | 88.8 | 22.20 |
| 15 | 16 | 4 | 0.0534 | 0.0286 | 182 | 45.50 |
| 15 | 8 | 32 | 0.0823 | 0.0049 | 30.95 | 7.74 |
| 15 | 8 | 16 | 0.0822 | 0.0098 | 62.12 | 15.53 |
| 15 | 8 | 8 | 0.0822 | 0.0196 | 125 | 31.25 |
| 15 | 8 | 4 | 0.0749 | 0.0399 | 254 | 63.50 |
| 15 | 4 | 32 | 0.1053 | 0.0071 | 45.15 | 11.29 |
| 15 | 4 | 16 | 0.1055 | 0.0142 | 90.19 | 22.55 |
| 15 | 4 | 8 | 0.1055 | 0.0282 | 179.75 | 44.94 |
| 15 | 4 | 4 | 0.1050 | 0.0564 | 359 | 89.75 |
| 20 | 32 | 32 | 0.0248 | 0.0014 | 8.78 | 2.20 |
| 20 | 32 | 16 | 0.0237 | 0.0027 | 17.3 | 4.33 |
| 20 | 32 | 8 | 0.0227 | 0.0054 | 34.4 | 8.60 |
| 20 | 32 | 4 | 0.0211 | 0.0112 | 71.6 | 17.90 |
| 20 | 16 | 32 | 0.0338 | 0.0019 | 12.27 | 3.07 |
| 20 | 16 | 16 | 0.0335 | 0.0038 | 24.2 | 6.05 |
| 20 | 16 | 8 | 0.0321 | 0.0076 | 48.3 | 12.08 |
| 20 | 16 | 4 | 0.0296 | 0.0157 | 100 | 25.00 |
| 20 | 8 | 32 | 0.0459 | 0.0027 | 17.45 | 4.36 |
| 20 | 8 | 16 | 0.0457 | 0.0054 | 34.59 | 8.65 |
| 20 | 8 | 8 | 0.0456 | 0.0109 | 69.7 | 17.43 |
| 20 | 8 | 4 | 0.0423 | 0.0225 | 143 | 35.75 |
| 20 | 4 | 32 | 0.0588 | 0.0039 | 24.94 | 6.24 |

TABLE-continued

Simulation Results

| SNR [dB] | Preamble Length | Number of Spreading Intervals | Phase STD [Rad] | Freq STD [Rad/Symbol] | Freq STD [Hz @ 5.12 Mbaud] | Freq STD [Hz @ 1.28 Mbaud] |
|---|---|---|---|---|---|---|
| 20 | 4 | 16 | 0.0595 | 0.0079 | 50.58 | 12.64 |
| 20 | 4 | 8 | 0.0601 | 0.0159 | 101.23 | 25.31 |
| 20 | 4 | 4 | 0.0605 | 0.0322 | 205 | 51.25 |
| 25 | 32 | 32 | 0.0137 | 0.0008 | 4.86 | 1.22 |
| 25 | 32 | 16 | 0.0133 | 0.0015 | 9.71 | 2.43 |
| 25 | 32 | 8 | 0.0129 | 0.0031 | 19.6 | 4.90 |
| 25 | 32 | 4 | 0.0117 | 0.0063 | 40 | 10.00 |
| 25 | 16 | 32 | 0.0190 | 0.0011 | 6.92 | 1.73 |
| 25 | 16 | 16 | 0.0188 | 0.0021 | 13.6 | 3.40 |
| 25 | 16 | 8 | 0.0182 | 0.0044 | 27.9 | 6.98 |
| 25 | 16 | 4 | 0.0167 | 0.0089 | 56.5 | 14.13 |
| 25 | 8 | 32 | 0.0257 | 0.0015 | 9.78 | 2.44 |
| 25 | 8 | 16 | 0.0256 | 0.0031 | 19.51 | 4.88 |
| 25 | 8 | 8 | 0.0258 | 0.0062 | 39.3 | 9.83 |
| 25 | 8 | 4 | 0.0235 | 0.0126 | 80.2 | 20.05 |
| 25 | 4 | 32 | 0.0338 | 0.0023 | 14.33 | 3.58 |
| 25 | 4 | 16 | 0.0335 | 0.0044 | 28.13 | 7.03 |
| 25 | 4 | 8 | 0.0335 | 0.0090 | 57.23 | 14.31 |
| 25 | 4 | 4 | 0.0335 | 0.0179 | 114 | 28.50 |
| 30 | 32 | 32 | 0.0078 | 0.0004 | 2.75 | 0.69 |
| 30 | 32 | 16 | 0.0075 | 0.0009 | 5.46 | 1.37 |
| 30 | 32 | 8 | 0.0073 | 0.0017 | 11 | 2.75 |
| 30 | 32 | 4 | 0.0067 | 0.0035 | 22.5 | 5.63 |
| 30 | 16 | 32 | 0.0107 | 0.0006 | 3.87 | 0.97 |
| 30 | 16 | 16 | 0.0106 | 0.0012 | 7.69 | 1.92 |
| 30 | 16 | 8 | 0.0102 | 0.0024 | 15.5 | 3.88 |
| 30 | 16 | 4 | 0.0093 | 0.0050 | 31.9 | 7.98 |
| 30 | 8 | 32 | 0.0144 | 0.0009 | 5.50 | 1.37 |
| 30 | 8 | 16 | 0.0143 | 0.0017 | 10.88 | 2.72 |
| 30 | 8 | 8 | 0.0142 | 0.0034 | 21.6 | 5.40 |
| 30 | 8 | 4 | 0.0133 | 0.0071 | 45.5 | 11.38 |
| 30 | 4 | 32 | 0.0186 | 0.0012 | 7.92 | 1.98 |
| 30 | 4 | 16 | 0.0188 | 0.0025 | 16.04 | 4.01 |
| 30 | 4 | 8 | 0.0189 | 0.0050 | 31.80 | 7.95 |
| 30 | 4 | 4 | 0.0187 | 0.0100 | 63.9 | 15.98 |

The simulation results described herein before with reference to the FIGURE and the Graph demonstrate that preamble length is the dominant factor for achieving phase offset estimation accuracy; while the number of spreading intervals in the dominant factor for achieving frequency offset estimation accuracy, where actual preamble length has a second order effect.

In view of the above, it can be seen the present invention presents a significant advancement in the characterization of impairments associated with DOCSIS 2.0 SCDMA burst receivers. It should be apparent that the present invention represents a significant departure from the prior art in construction and operation. However, while particular embodiments of the present invention have been described herein in detail, it is to be understood that various alterations, modifications and substitutions can be made therein without departing in any way from the spirit and scope of the present invention, as defined in the claims which follow.

What is claimed is:

1. A method of estimating frequency and phase offset in a burst receiver, the method comprising:
    receiving a predetermined sequence of incoming symbols defining a burst preamble;
    calculating the phase in the complex plane of each symbol and generating a burst preamble symbol phase matrix therefrom defined as $$\underline{P} = \begin{bmatrix} 1 & -N \\ 1 & -(N-1) \\ \vdots & \vdots \\ 1 & N \end{bmatrix} \begin{bmatrix} \text{Phase\_Offset} \\ \text{Frequency\_Offset} \end{bmatrix} = \underline{H}\theta,$$

when the incoming symbols are continuous in time interval [−N,N]; and
    implementing least square parameter estimation on the predetermined sequence of incoming symbols based on the burst preamble symbol phase matrix to estimate incoming data phase offset and frequency offset.

2. The method according to claim 1, wherein the burst receiver is a SCDMA burst receiver.

3. The method according to claim 1, wherein implementing least square parameter estimation on the predetermined sequence of incoming symbols based on the burst preamble symbol phase matrix to estimate the incoming data phase offset and frequency offset, comprises calculating a weighted least square solution according to a relationship defined by $\hat{\theta}\text{wls} = (H^T W H)^{-1} H^T W P$.

4. The method according to claim 3, wherein the estimated incoming data phase offset and frequency offset are estimated according to a relationship defined by $$\text{Phase\_Offset} = \frac{1}{2N+1} \sum_{i=-N}^{N} P_i$$

$$\text{Frequency\_Offset} = \frac{3}{N(N+1)(2N+1)} \sum_{i=-N}^{N} i \cdot P_i$$

5. The method according to claim 3, wherein the weighted least squares solution comprises using weighted least squares that disregard symbols affected by impulse noise or burst noise.

6. The method according to claim 3, wherein the weighted least squares solution comprises using weighted least squares that disregard symbols affected by dominant noise affecting those symbols.

7. The method according to claim 3, wherein the weighted least squares solution comprises imparting greater weight to last symbols to more accurately estimate contemporary impairments.

8. A method of estimating frequency and phase offset in a burst receiver, the method comprising:
   receiving a predetermined sequence of incoming symbols defining a burst preamble;
   calculating the phase in the complex plane of each symbol and generating a burst preamble symbol phase matrix therefrom defined as $P = \text{Phase\_Offset} + \text{Frequency\_Offset} * X_i = H\theta$, where $$H^T P = \begin{pmatrix} \sum_{i=1}^{n} p_i \\ \sum_{i=1}^{n} p_i x_i \end{pmatrix},$$

when the incoming symbols are not continuous in time; and
   implementing least square parameter estimation on the predetermined sequence of incoming symbols based on the burst preamble symbol phase matrix to estimate incoming data phase offset and frequency offset.

9. The method according to claim 8, wherein implementing least square parameter estimation on the predetermined sequence of incoming symbols based on the burst preamble symbol phase matrix to estimate the incoming data phase offset and frequency offset, comprises calculating a weighted least square solution according to a relationship defined by $\hat{\theta}\text{wls} = (H^T W H)^{-1} H^T W P$.

10. The method according to claim 9, wherein the estimated incoming data phase offset and frequency offset are estimated according to a relationship defined by $$\begin{bmatrix} \text{Phase\_Offset} \\ \text{Frequency\_Offset} \end{bmatrix} = \begin{pmatrix} \bar{m}_p - \frac{\sigma_{xp}}{\sigma_{xx}} \cdot \bar{m}_x \\ \frac{\sigma_{xp}}{\sigma_{xx}} \end{pmatrix},$$

where $\bar{\sigma}_{xp} = \frac{1}{n}\sum_{i=1}^{n} x_i p_i, \bar{m}_x = \frac{1}{n}\sum_{i=1}^{n} x_i,$ $\sigma_{xp} = \bar{\sigma}_{xp} - \bar{m}_x \bar{m}_p, \bar{\sigma}_{xx} = \frac{1}{n}\sum_{i=1}^{n} x_i^2, \bar{m}_p = \frac{1}{n}\sum_{i=1}^{n} p_i,$ and $\sigma_{xx} = \bar{\sigma}_{xx} - \bar{m}_x^2$.

11. The method according to claim 9, wherein the weighted least squares solution comprises using weighted least squares that disregard symbols affected by impulse noise or burst noise.

12. The method according to claim 9, wherein the weighted least squares solution comprises using weighted least squares that disregard symbols affected by dominant noise affecting those symbols.

13. The method according to claim 9, wherein the weighted least squares solution comprises imparting greater weight to last symbols to more accurately estimate contemporary impairments.

* * * * *